United States Patent [19]

Barnhardt

[11] 4,284,913
[45] Aug. 18, 1981

[54] COOLING ARRANGEMENT FOR AN INTEGRATED DRIVE-GENERATOR SYSTEM

[75] Inventor: Scott B. Barnhardt, Shawnee Township, Allen County, Ohio

[73] Assignee: Westinghouse Electric Corp., Pittsburgh, Pa.

[21] Appl. No.: 44,299

[22] Filed: May 31, 1979

[51] Int. Cl.³ .............................................. H02K 9/00
[52] U.S. Cl. ........................................ 310/54; 310/53; 310/112; 310/83
[58] Field of Search ................... 310/53, 54, 56, 58, 310/59, 60 R, 61, 63, 64, 83, 112, 113; 290/2; 322/33, 34

[56] References Cited

U.S. PATENT DOCUMENTS 2,175,913  10/1939  Philipp ................................. 310/54

Primary Examiner—Mark O. Budd
Attorney, Agent, or Firm—G. H. Telfer

[57] ABSTRACT

An integrated drive-generator system in which a casing housing a constant speed drive unit is attached to a casing housing a generator unit with means being provided to isolate mechanically debilitating debris within the unit which expelled it and so avoid damaging the other unit. The units share a common lubrication-coolant fluid system which provides fluid circulation to both from a reservoir. Expelled debris is isolated within the faulty unit by a barrier partition which separates the interiors of the units' casings and supports a breather which promotes fluid communication between the units' casings and permits a single pressurizing device to service both units. A scavenge pump for extracting fluid from each unit and transmitting it to the reservoir is located within the unit it services. As a result, if debris expelled by either unit becomes entrained in the fluid of that unit, only the scavenge pump within that unit will be damaged or jammed and system repair will be limited to the faulty unit. Thus, the units are cooperatively integrated as regards their functioning, but are effectively segregated as regards debilitating debris within the debris originating unit so as to isolate and minimize the damage to the system.

3 Claims, 3 Drawing Figures

COOLING ARRANGEMENT FOR AN INTEGRATED DRIVE-GENERATOR SYSTEM

BACKGROUND OF THE INVENTION

1. Field of the Invention

This invention relates to integrated apparatus each having a constant speed drive unit and generator unit, and more particularly, to means for obstructing debris originating in one unit from entering the other unit and at the same time permitting fluid communication between the units.

2. Description of the Prior Art

Weight reduction of aircraft components is an important engineering objective which, when achieved, permits an increased aircraft pay load. In recent years, for specified power ratings, substantial reductions in size and weight of aircraft electric generators have been achieved. Much of the size and weight reduction was obtained from integrating a constant speed drive unit and a spray-oil cooled generator unit into a single apparatus with both units sharing a common oil system. High heat transfer coefficients provided by spray oil cooling permitted the size and weight of the integrated apparatus to be reduced and at the same time increase the reliability.

The constant speed drive unit and generator unit had casings which were connected and respectively housed a drive apparatus and generator internals. Integrated drive generator apparatus have, in the past, utilized parallel flow scavenge pumps located in the constant speed drive unit. One pump typically transmitted lubrication-coolant fluid primarily from a point in the generator's casing furthest removed from the constant speed drive unit casing while the second pump scavenged lubrication-coolant fluid from the constant speed drive unit casing and the generator casing portion adjacent the constant speed drive unit's casing. Large openings at the interface between the constant speed drive unit-generator unit enabled evacuation and scavenging of the generator casing's interior by the second scavenging pump. Disposition of both scavenging pumps in the constant speed drive unit facilitated removal and replacement of the generator unit since the number of connections therebetween was minimized and simplified. However, when either unit failed and expelled debris, migration of that debris into the unfailed unit sometimes induced failure of the unfailed unit and caused both units to be removed from service.

Typical constant speed drive units include a pressurizing system which facilitates scavenge pump removal of the lubrication-coolant fluid from the interiors of both units' casings. Inclusion of a solid partition between the constant speed drive unit and the generator unit to prevent debris migration across the interface therebetween would prevent pressurization of the generator casing's interior. Moreover, debris from faulty generator units was sometimes withdrawn from the generator casing's interior into the generator's scavenge pump. Since both scavenge pumps were, heretofore, located in the constant speed drive unit, debris withdrawn from a disabled generator by either pump sometimes disabled the withdrawing pump and thus the constant speed drive unit in addition to the failed generator.

Complete structural segregation of the constant speed drive unit and generator unit was desired for the integrated apparatus while avoiding the use of a second casing pressurizing system. Additionally, debris from a failed unit, if fluidly transportable and sufficiently large to jam the scavenge pump evacuating that unit or of electrically conductive nature capable of short circuiting the generator, should be isolated within the failed unit to facilitate removal of the failed unit and prevent additional apparatus damage.

SUMMARY OF THE INVENTION

In accordance with the present invention, an improved integrated drive generator system is provided for isolating debris expelled by one unit within the same unit while maintaining the desired lubrication-coolant fluid communication between the units and utilizing a single pressurizing system for the casings' interiors. The invention generally comprises a constant speed drive unit including a casing, an electrical generator unit attachable to the drive unit including a casing, means for supplying lubrication-coolant fluid to both units, means for scavenging heat laden lubrication-coolant fluid from the interiors of the units' casings, means for cooling the heat laden lubrication-coolant fluid prior to its entry into both units, and barrier means for obstructing debris migration and promoting fluid communication between the attachable units. The barrier means segregates the casings' interiors of the two units and prevents components or portions thereof from a faulty unit from being expelled into the attached operable unit while, at the same time, providing fluid communication between the casings' interiors so as to allow pressurization of both interiors by a single pressurizing apparatus. Inclusion of a breather in the barrier means enables fluid communication therethrough.

In a preferred embodiment of the invention, the means for scavenging the generator's casing interior constitutes a scavenging pump arranged in the generator unit. The generator-disposed scavenging pump is aided in withdrawing the lubrication-coolant fluid from the generator casing's interior and transmitting it to the supplying means by the pressurizing apparatus. The generator-disposed scavenging pump is preferably driven by a rotatable shaft supported within the generator to provide greatest simplicity and highest reliability. The barrier means of the present invention is preferably joined to the generator's casing so as to permit handling and manipulation of the generator unit during non-attachment to the drive unit without risk of foreign matter intrusion into the generator and damage to the generator's components housed within the casing. As such, the generator alone can be commercially handled and easily replaced rather than the entire integrated drive-generator apparatus.

BRIEF DESCRIPTION OF THE DRAWINGS

This invention will be more fully understood from the following detailed description of a preferred embodiment, taken in connection with the accompanying drawings, in which.

DESCRIPTION OF THE PREFERRED EMBODIMENTS

The present invention is concerned primarily with isolating separatable units which, when assembled together, constitute an integrated drive generator apparatus. The separable units comprise a constant speed drive unit and a generator linked to and driven thereby.

Figure 1:
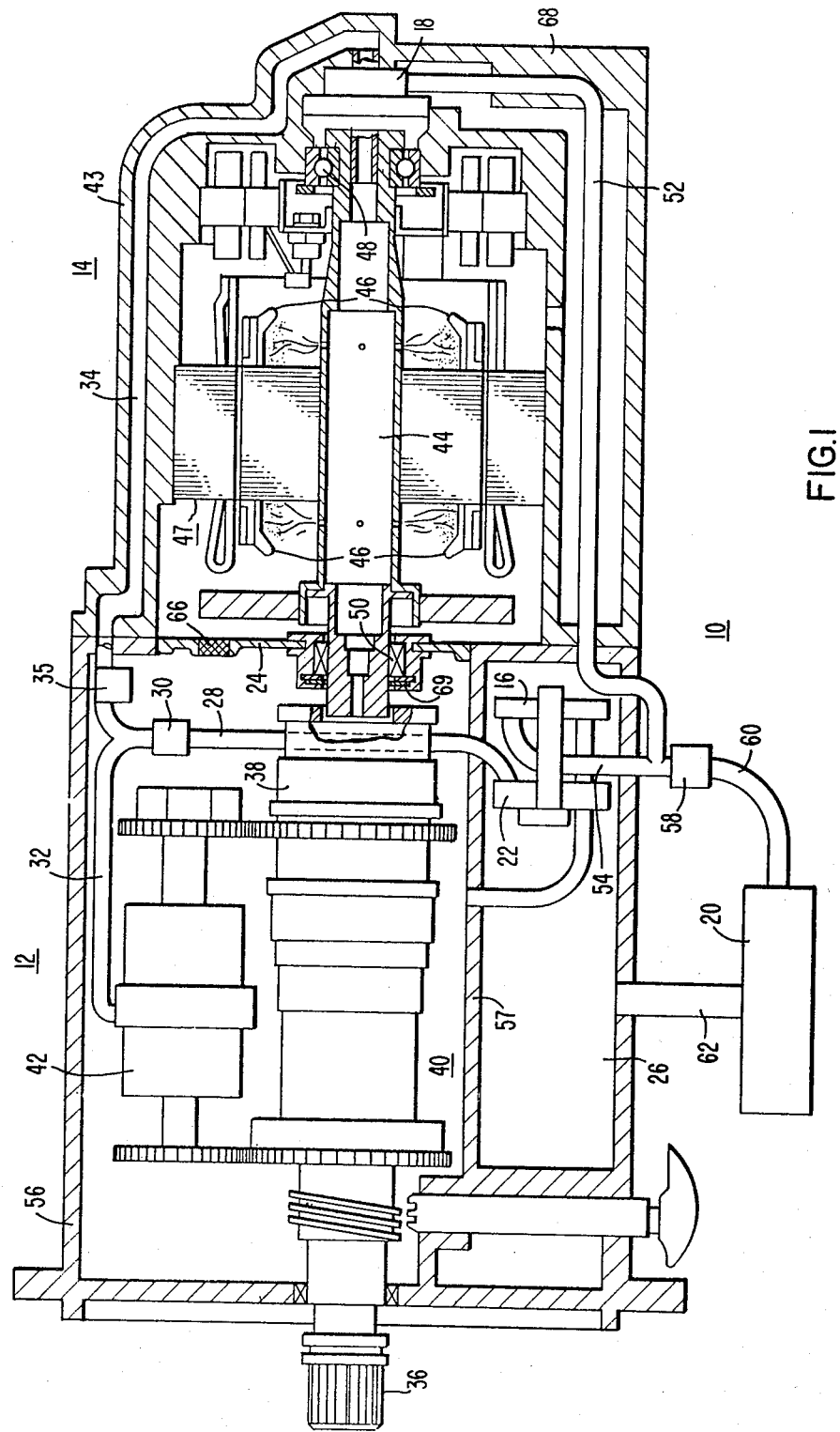
FIG. 1 is a schematic view of an exemplary integrated drive generator system in which the invention is incorporated.

An integrated drive generator system 10 typically utilized in aircraft applications is schematically illustrated in FIG. 1. System 10 includes a constant speed drive unit 12, scavenging pumps 16 and 18 respectively arranged within drive unit 12 and generator unit 14, cooler 20 which extracts heat from lubrication-coolant fluid circulated therethrough, charge pump 22 for transmitting the fluid to the drive unit 12 and generator 14, and barrier 24 which obstructs debris expelled by one of the attached units from entering the other attached unit.

Lubrication-coolant fluid is drawn from reservoir 26 and discharged into supply line 28 by charge pump 22. Charge filter 30 is disposed in supply line 28 to remove impurities and other contaminants from the lubrication-coolant fluid. Supply line 28 is bifurcated preferably downstream from charge filter 30 into supply conduits 32 and 34 which respectively transmit the fluid to constant speed drive unit 12 and generator unit 14. Priority valve 35 is preferably disposed on generator supply conduit 34 to direct the lubrication-coolant fluid to the constant speed drive unit 12 when unfavorable fluid conditions such as abnormally low fluid pressure are encountered.

The constant speed drive unit 12 includes an input shaft 36 and output shaft 38. Gear differential 40 and hydraulic units 42 are housed within drive unit 12 and cooperate to provide the desired speed of output shaft 38 for varying speeds of input shaft 36. The means for driving input shaft 36 is not relevant to the present invention and any suitable driving means could be utilized.

The remaining supply conduit, 34, extends axially along generator 14's casing 43 and is routed to the end of hollow generator shaft 44. Through appropriate sealing means the fluid is transmitted from supply line 34 into the interior of hollow shaft 44 from whence it is sprayed radially outward to cool the illustrated portions of field windings 46 carried on shaft 44. Electrical current is induced in the illustrated stator structure 47 which surrounds shaft 44 and the associated field windings 46. Shaft 44 is journaled at opposite axial ends by oil lubricated bearings 48 and 50. The fluid sprayed into generator casing 43 absorbs heat from selected generator portions including the field 46, drains to the bottom of casing 43, is withdrawn therefrom by generator scavenge pump 18, and is discharged through return line 52.

Constant speed drive unit scavenge pump 16 extracts the lubrication-coolant fluid from constant speed drive unit casing 56 and discharges that fluid into return line 54. Much of the fluid withdrawn from casing 56 entered thereinto from generator shaft 44 which protrudes into casing 56 above bulkhead 47 which separates reservoir 26 from gear differential 40 and hydraulic units 42 and is interconnected with casing 56. Scavenge filter 58 which further cleanses contaminants from the return fluid is preferably disposed downstream from a juncture of return lines 52 and 54. Unitary return line 60 extends from the juncture of return lines 52 and 54 through the scavenge filter 58 to cooler 20 where heat from the heat laden fluid is removed by any suitable means. From the cooler 20, the fluid is routed through reservoir line 62 and returned to the fluid reservoir 26 from whence it began.

Charge pump 22 and scavenge pump 16 are preferably housed within constant speed drive unit casing 56 and are preferably mechanically driven by suitable linkages to the rotatable shafts and/or gear differentials of the constant speed drive unit 12. Barrier partition 24 is a solid member disposed to obstruct debris expelled from either of the units from entering the other attached unit. Breather 66 is supported by barrier 24 above the normal operational fluid level 68 so as to permit fluid communication between the casing interiors of constant speed drive unit 12 and generator 14. Such fluid communication enables pressurization of both casings by a single pressurizing means which is typically disposed in constant speed drive unit 12. Pressurization of both casings' interiors facilitates fluid evacuation from the casings by scavenge pumps 16 and 18. Breather 66 generally constitutes a series of baffles which are cooperatively disposed to obstruct traversal of solid debris of any substantial size expelled by either unit while permitting migration therethrough of gaseous substances typically provided by the pressurizing apparatus. Bearing 50 is preferably supported by barrier partition 24 which, in turn, is preferably affixed to generator 14's casing 43.

Figure 2:
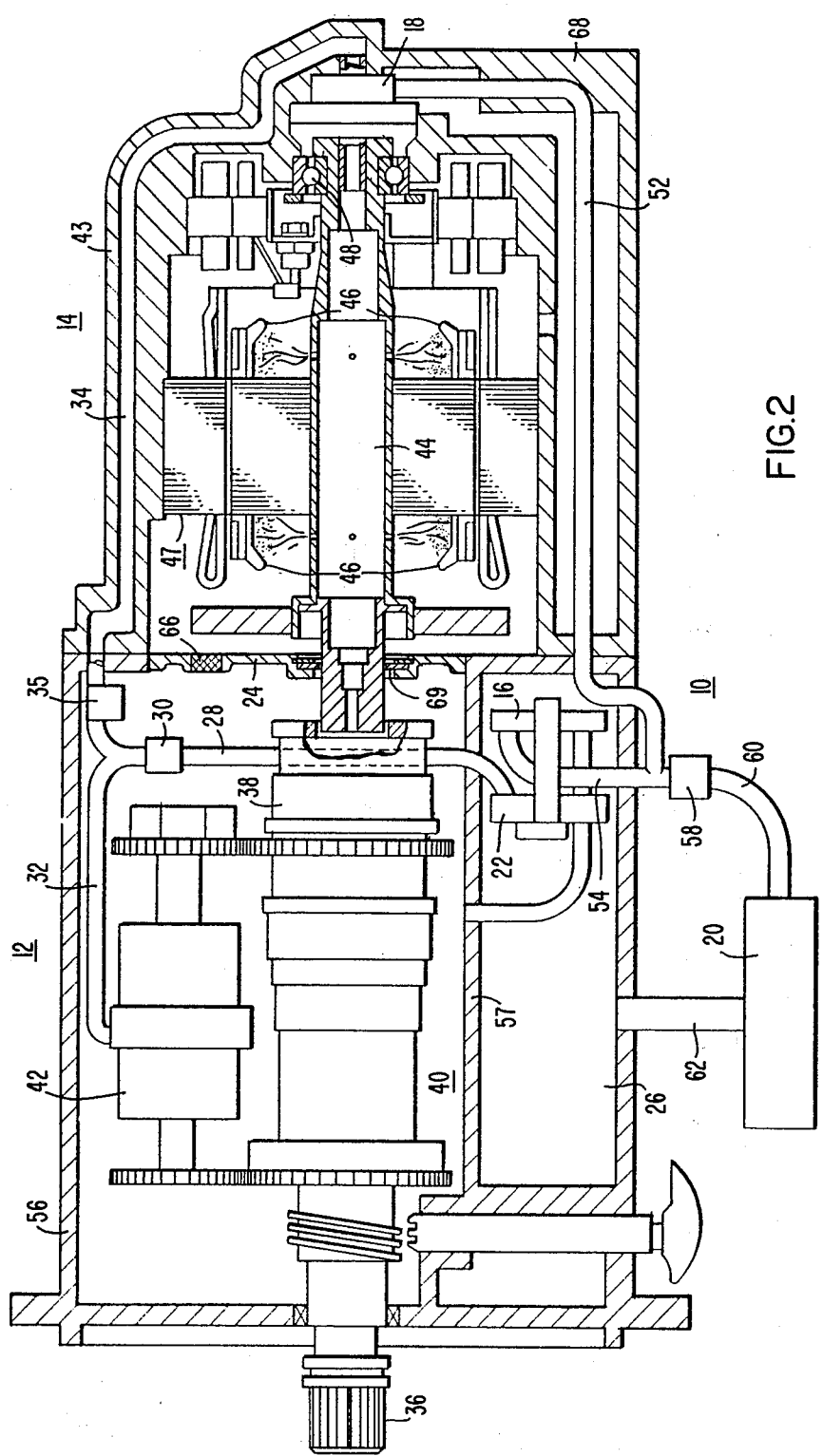
FIG. 2 is a schematic view of an exemplary integrated drive generator system of alternate construction in which the invention is incorporated.

An alternate embodiment of the present invention is illustrated in FIG. 2 in which barrier partition 24 may be seen to include sealing means 69 which is narrowly spaced apart from generator shaft 44. The embodiment of FIG. 2 is typical for generator units 14 utilizing only journal bearing 48. Sealing means 69 is also utilized for the double bearing arrangement as illustrated in FIG. 1.

Figure 3:
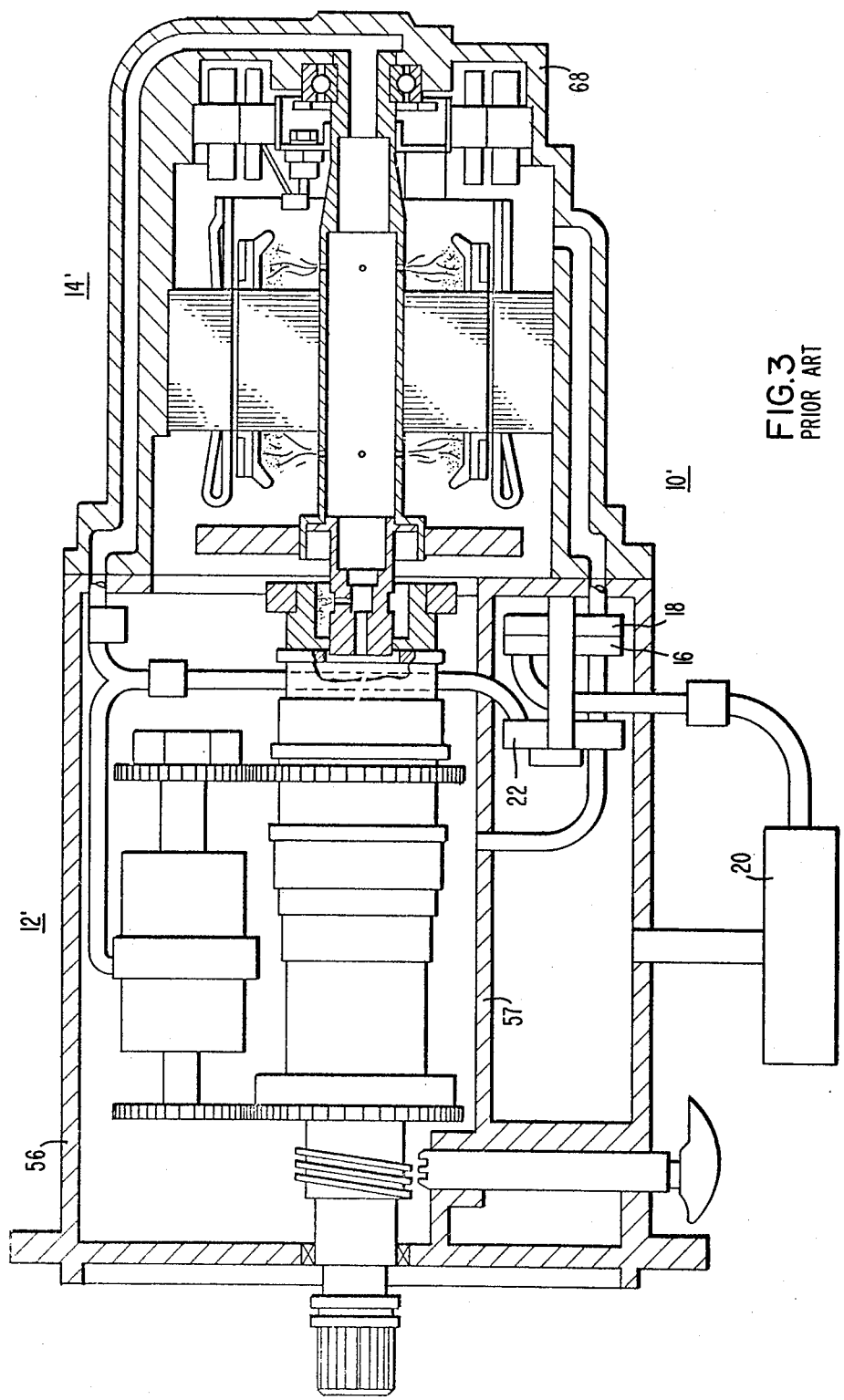
FIG. 3 is a schematic view of a prior art integrated drive generator system.

FIG. 3 illustrates a prior art integrated drive generator system. As can be seen from comparing FIGS. 1 and 2 with FIG. 3, the most striking differences therebetween is the disposition of generator scavenging pump 18 within casing 56 of constant speed drive unit 12' and complete absence of partition 24 and integral breather 66. The lubrication-coolant fluid flow of FIG. 3 is substantially identical to that of FIGS. 1 and 2. However, when either of the attached units (12' or 14') failed and expelled debris into the other unit, the performance of the other, previously unfailed unit was often adversely affected thereby. Additionally, since both scavenge pumps, 16 and 18, were located within drive unit casing 56, contaminants or debris carried in the return fluid transmitted by scavenge pump 18 posed a threat of scavenge pump damage and its removal from service. In either of the aforementioned cases, both units, 12' and 14', were necessarily replaced. In other words, solid debris expelled by either unit 12' or 14' could migrate from one unit to the other and result in failure of the previously unfailed unit or if debris from either unit 12' or 14' entered the generator return fluid withdrawn by scavenge pump 18 and that debris adversely affected the performance of scavenge pump 18, both units (12' and 14') again were necessarily removed from service, repaired, and/or replaced. Such is not the case with the present invention's configuration since solid debris from either unit 12 or 14 is isolated within the unit which expelled it so as to avoid further damage. Also, since scavenge pump 18 of the present invention is located within generator casing 43, any debris entering and jamming scavenge pump 18 will only necessitate the replacement and/or repair of generator unit 14 rather than both units. Furthermore, disposition of breather 66 in barrier partition 24 permits pressurizing the interiors of both casings (43 and 56) by a single pressurizing means similar to the presently used device.

Although barrier partition 24 is illustrated as being connected to generator casing 43, it is to be understood that it could be attached with equal facility and similar results to constant speed drive casing 56. Installation of such barrier partition 24 and integral breather 66 can substantially reduce the extent of failure of the integrated drive generator system 10 so as to minimize replacement cost, time, and effort when failure of either unit 12 or 14 occurs. Repositioning of scavenge pump 18 within the casing (43) which it services also minimizes the units which must be removed from service and repaired in case of generator failure. As such, integrated drive generator system 10's reliability is increased and the cost of repair or replacement is minimized.

I claim:

1. An integrated drive generator system comprising:
   a constant speed drive unit, said unit including an input shaft, an output shaft, means linked to said input and output shafts for driving said output shaft at constant speed for varying input shaft speeds, and a casing for housing said shafts and constant speed drive means;
   an electrical generator unit having a rotatable shaft linkable to said constant speed output shaft and a casing for housing said rotatable shaft, said generator casing being attachable to said drive unit casing and having an operational lubrication-coolant fluid level associated therewith;
   means for supplying lubrication-coolant fluid to said drive unit and said generator unit;
   a scavenging pump for scavenging heat laden lubrication-coolant fluid from the casings' interiors, said scavenging pump being in fluid communication with said supplying means and located within said generator casing;
   means for cooling the heat laden lubrication-coolant fluid prior to its entry into the drive and generator units; and
   barrier means for obstructing debris migration between the attachable units, said barrier means including means for providing fluid communication between the units comprising a plurality of baffles cooperatively disposed to obstruct migration of solid debris between units and promote fluid transmission therebetween, said baffles being disposed above the normal, operational lubrication-coolant fluid level.

2. The integrated drive generator system of claim 1 wherein said scavenging pump is driven by said generator's rotatable shaft.

3. The integrated drive generator system of claim 1 wherein said barrier means is attached to and sealed against said generator's casing.

* * * * *